Patented Sept. 6, 1932

1,875,903

UNITED STATES PATENT OFFICE

IRA WILLIAMS AND ARTHUR M. NEAL, OF WILMINGTON, DELAWARE, ASSIGNORS TO E. I. DU PONT DE NEMOURS & COMPANY, OF WILMINGTON, DELAWARE, A CORPORATION OF DELAWARE

METHOD OF IMPROVING AGING QUALITIES OF RUBBER AND RESULTING PRODUCT

No Drawing.    Application filed July 24, 1930.    Serial No. 470,539.

This invention relates to a method of improving rubber substances and to the resulting rubber product, and is more particularly concerned with a method of treatment whereby a rubber product is obtained which is unusually resistant to deterioration.

It is generally accepted that the rate of deterioration of rubber articles differs greatly depending on various factors, such as the composition of the stock, the form of the article and the conditions under which it is used.

Aromatic diamines have been employed for the protection of rubber against heat, oxidation and for the purpose of accelerating vulcanization. These materials have, however, been objectionable because of their poisonous nature and especially because of the stain produced on the hands and clothes of persons coming in contact with these materials.

The primary object of this invention is to provide a material having substantially the same effects as the aromatic diamines heretofore employed but which at the same time will be free from the objections of such diamines.

With these objects in view it has now been discovered that the carboxylic acid salts of primary aromatic diamines are free from the objections characteristic of the diamines and may be added to a rubber mix to obtain rubber products which, when vulcanized, show a marked improvement in their age-resisting properties. While aromatic carboxylic acids, such as benzoic, phthalic, naphthoic, and naphthalic acid, and dicarboxylic aliphatic acids, such as oxalic and malonic acids, are preferred, other acids such as acetic acid have been found to be satisfactory. Among the other acids which have been used to prepare these salts may be mentioned the amino and hydroxy aliphatic acids, such as phenyl glycine, tartaric acid, and citric acid.

These salts may be prepared by bringing together the acid and amine either with or without the presence of a solvent. In case the salt has a low melting point and does not decompose at this temperature, the products may be melted together. At other times, it may be more advantageous to react the materials in the presence of a solvent which is later evaporated or recovered by filtering off the solid material. The preparation of these compounds, however, is not a part of the present invention, is fully described in the literature and will be obvious to any chemist skilled in the art.

In order to disclose the invention in detail the following examples of actual embodiments thereof are presented. It is understood, however, that these examples are furnished purely for purposes of illustration and that it is not the intention that the invention be limited to the particular reagents, proportions or other conditions therein specified.

Example I 108 pounds of p-phenylene diamine (2 moles) and 45 pounds of oxalic acid (1 mole) are dissolved separately in warm alcohol and the two solutions are then mixed. The p-phenylene diamine oxalate is insoluble and separates as small white plates. It has the following formula:

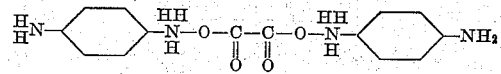

Example II 122 pounds of 1-methyl 2-4 diamino benzene (2 moles) and 45 pounds of oxalic acid (1 mole) are dissolved separately in alcohol and the solutions are mixed. The insoluble salt separates as small, slightly copper colored plates. It has the following formula:

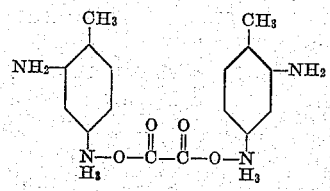

Two stocks were made up upon the rolls of an ordinary mill in the following proportions by weight:

|  | Control | Number 2 |
|---|---|---|
| Smoked sheet rubber | 100 | 100 |
| Zinc oxide | 18 | 18 |
| Di-ortho-tolyl-guanidine | 0.56 | 0.56 |
| Sulfur | 2.75 | 2.75 |
| 1-methyl 2-4 diamino benzene oxalate | | 0.60 |

The two stocks were vulcanized and then suspended in air at 90° C. and the successive decrease in tensile strength noted. The results are indicated in the table following.

*Example III*

One molecular proportion of 1 methyl 2-4 diamino benzene is fused with one molecular proportion of benzoic acid at a temperature of about 100° C. After cooling the material is a solid which can be ground to produce light brown powder having the formula

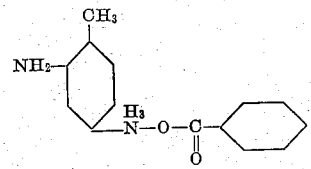

Stock #3 was made up of the same composition at #2 of Example 2 excepting that this compound, 1 methyl 2-4 diamino benzene benzoate, was employed as the antioxidant. This stock upon vulcanization was subjected to the same tests as that of Example 2 with the results indicated in the table below.

*Example IV*

Two molecular proportions of 1-5 naphthylene diamine are mixed in warm alcoholic solution with one molecular proportion of oxalic acid. The resulting light colored plates are separated by filtration. The compound has the following formula:

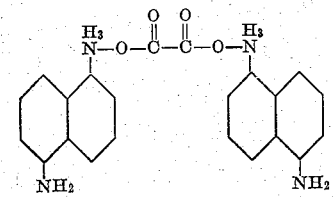

*Example V*

122 grams of 1-methyl 2-4 diamino benzene and 60 grams of glacial acetic acid were mixed and heated until the product became liquid. The product formed was a dark colored viscous mass.

That the use of a small amount of materials of the type illustrated by the above examples exerts a marked preserving influence on the rubber when exposed to air at high temperatures is clearly established by the following tabulation of results obtained by actual tests.

*Table I*

[Tensile strength in lbs./sq. inch when aged in air at 90° C.]

| Compound Days aged | Control | Example number 1 | Example number 2 | Example number 3 | Example number 4 | Example number 5 |
|---|---|---|---|---|---|---|
| 0 | 3075 | 3945 | 3000 | 3075 | 3000 | 3450 |
| 1 | 2150 |  | 2625 | 2575 | 2900 |  |
| 2 | 1525 | 2125 | 2050 | 2025 | 1900 | 2615 |
| 3 | 675 | 1570 | 1400 | 1400 | 1475 | 2300 |
| 4 | 175 | 805 | 975 | 1200 | 1000 | 1915 |
| 5 |  | 270 | 650 | 850 | 1225 | 1235 |

It will be understood that in preparing the compounds contemplated by this invention, 1 mole of diamine may be reacted with 1 mole of the acid, or 1 mole of the diamine may be reacted with 2 moles of the acid or, where a dicarboxylic acid is employed, 2 moles of the diamine may be reacted with 1 mole of the acid. The preferred class of antioxidants, however, includes those compounds prepared by neutralizing the acid with only one amino group of the diamine molecule and of this class in particular those compounds prepared from acetic, oxalic and benzoic acids and meta-toluylene-diamine represent the preferred embodiment.

These reactions are illustrated by the following equations:

2 moles + 1 mole acid

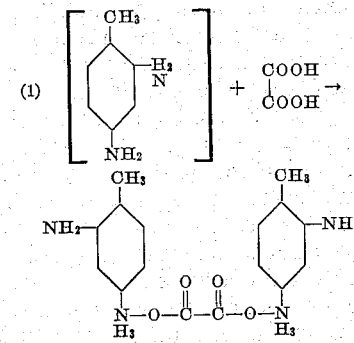

1 mole + 1 mole acid

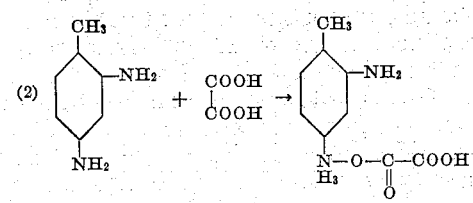

1 mole + 2 moles acid

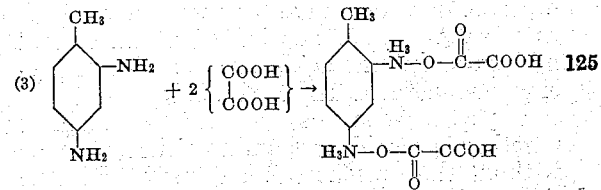

Although for purposes of illustration in the above equations, meta-toluylene-diamine and oxalic acid have been employed, it will be understood that the equations are representative of the reactions involved in the preparation of the various compounds contemplated by the present invention.

It will be obvious that many other compounds falling within the general class herein described may be employed, and that the phenyl groups may contain alkyl, hydroxy, and alkoxy substituents without materially altering the value of the salts as antioxidants. Among other salts which have been tested and found adapted for use may be mentioned the following: phenyl glycine salt of meta toluylene diamine, citrate of meta toluylene diamine, acetate of meta toluylene diamine, phthalate of meta toluylene diamine.

Among other diamines which may be employed in the preparation of such salts may be mentioned: meta phenylene diamine, benzidine, dianisidine, tolidine.

The antioxidants described herein may be incorporated with the unvulcanized rubber by any well known means such as by milling them into the stock upon the rolls of an ordinary mill. Moreover, they can be successfully employed in various rubber compounds and rubber substitutes, such as, for example, gutta percha, balata, reclaimed and synthetic rubber. It is therefore to be understood that the invention is not limited to any particular rubber stock or rubber compound. Also, the proportions of the antioxidant employed may be varied within wide limits, depending upon the stock treated and the conditions to be met in use, although, under ordinary circumstances, from 0.25% to 2.0% of the antioxidant based on the weight of the rubber has been found to be highly satisfactory.

While we prefer to use the antitoxidants of this type by adding the antioxidant to the rubber mix prior to vulcanization, it is also possible to use them for the treatment of vulcanized rubber. In such cases, the rubber may be impregnated by a solution of the antioxidant in a suitable solvent or where practicable by employing the antioxidant in vapor form.

As many apparent and widely different embodiments of this invention may be made without departing from the spirit thereof, it is to be understood that we do not limit ourselves to the foregoing examples or description except as indicated in the following claims:

We claim:

1. The process of increasing the resistance of rubber to deterioration which comprises incorporating with the rubber a salt obtained by reacting a carboxylic acid and a primary aromatic diamine.

2. The process of increasing the resistance of rubber to deterioration which comprises incorporating with the rubber a vulcanizing agent, and a salt obtained by reacting a carboxylic acid and a primary aromatic diamine and thereafter vulcanizing.

3. The process of increasing the resistance of rubber to deterioration which comprises incorporating with the rubber a vulcanizing agent, and a salt obtained from reacting an aromatic diamine and an acid of the group consisting of acetic, oxalic and benzoic acids, and thereafter vulcanizing.

4. The process of increasing the resistance of rubber to deterioration which comprises incorporating with the rubber a vulcanizing agent, and a salt resulting from reacting a primary aromatic diamine of the group consisting of meta-toluylene-diamine, p-phenylene diamine and 1:5-naphthylene diamine and an acid of the group consisting of acetic, oxalic and benzoic acids, and thereafter vulcanizing.

5. The process of increasing the resistance of rubber to deterioration which comprises incorporating with the rubber a vulcanizing agent, and a salt resulting from neutralizing an acid of the group consisting of acetic, oxalic and benzoic acids, with only one amino group of meta-toluylene-diamine, and thereafter vulcanizing.

6. The process of increasing the resistance of rubber to deterioration which comprises incorporating with the rubber a vulcanizing agent, and a salt resulting from reacting meta-toluylene-diamine and oxalic acid, and thereafter vulcanizing.

7. The process of increasing the resistance of rubber to deterioration which comprises incorporating with the rubber a vulcanizing agent, and a salt resulting from neutralizing oxalic acid with meta-toluylene-diamine under such conditions that only one amino group of the diamine molecule is substituted, and thereafter vulcanizing.

8. The process of increasing the resistance of rubber to deterioration which comprises incorporating with the rubber a vulcanizing agent, and a salt obtained from reacting an aromatic diamine and an organic dicarboxylic acid.

9. The process of increasing the resistance of rubber to deterioration which comprises incorporating with the rubber a vulcanizing agent, and a salt obtained from reacting meta-toluylene-diamine and an organic dicarboxylic acid.

10. A rubber compound containing a salt obtained by reacting a carboxylic acid and a primary aromatic diamine.

11. A vulcanized rubber product obtained by incorporating with the rubber a vulcanizing agent and a salt obtained from reacting a carboxylic acid and an aromatic diamine, and vulcanizing.

12. A vulcanized rubber product obtained by incorporating with the rubber a vulcanizing agent, and a salt obtained from reacting an aromatic diamine and an acid of the group consisting of acetic, oxalic and benzoic acids, and thereafter vulcanizing.

13. A vulcanized rubber product obtained by incorporating with the rubber a vulcanizing agent, and a salt resulting from reacting 1 mole of a primary aromatic diamine and an equivalent weight of an acid of the group consisting of acetic, oxalic and benzoic acids, and thereafter vulcanizing.

14. A vulcanized rubber product obtained by incorporating with the rubber a vulcanizing agent, and a salt resulting from reacting an acid of the group consisting of acetic, oxalic, and benzoic acids with such an amount of meta-toluylene-diamine that only one amino group of the diamine molecule is substituted, and thereafter vulcanizing.

15. A vulcanized rubber product obtained by incorporating with the rubber a vulcanizing agent, and a salt resulting from reacting meta-toluylene-diamine and oxalic acid, and thereafter vulcanizing.

16. A vulcanized rubber product obtained by incorporating with the rubber a vulcanizing agent, and a salt obtained from reacting an aromatic diamine and an organic dicarboxylic acid.

In testimony whereof we affix our signatures.

IRA WILLIAMS.
ARTHUR M. NEAL.